Patented Nov. 28, 1944

2,363,504

UNITED STATES PATENT OFFICE 2,363,504

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 26, 1942,
Serial No. 463,438

5 Claims. (Cl. 252—336)

This invention relates to the treatment of petroleum emulsions, and has for its main object to provide novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipe line oil.

Briefly described, our process consists in subjecting a petroleum emulsion of the water-in-oil type, to the action of a demulsifying agent comprising a compound consisting of certain amido pyridinium salts of alkylated naphthalene sulfonic acids in which there is at least one alkyl group substituted in the naphthalene nucleus, the said alkyl group or groups, in turn, being characterized by containing at least three carbon atoms and not more than 10 carbon atoms. Said alkylated sulfonic acid can be described by the following formula: $D(SO_3H)_n$, in which $n$ indicates any small whole numbers, such as 1, 2, or 3; but generally speaking, the monosulfonic acid would be employed, and for purposes of brevity, the formula $D.SO_3H$ will be used.

It is well known that one can prepare a variety of amido pyridinium compounds, characterized by the following formula:

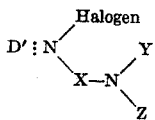

in which D′⋮N represents a radical derived from a heterocyclic compound of the pyridine series, consisting of pyridine, quinoline, isoqinoline, and C-methyl linked homologs thereof; and X is a divalent aliphatic radical; and Y is an acyl radical, a hydrocarbon radical having not over 22 carbon atoms, an alkylol radical; or a hydroxylated aliphatic ether radical; and Z is the same as Y or a hydrogen atom, with the added proviso that there must be an acyl radical directly linked to the trivalent nitrogen atom; and that there must be present at least one hydrocarbon radical containing at least 8 carbon atoms and not more than 32 carbon atoms as an integral part of at least one of the radicals directly linked to the trivalent nitrogen atom.

As illustrations, reference is made to the following species:

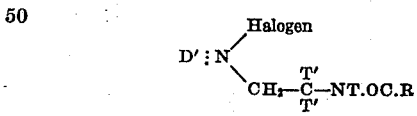

in which the acyl radical R.CO is derived from a monocarboxy detergent-forming acid having at least 8 and not more than 32 carbon atoms, and D′⋮N represents a radical derived from a heterocyclic compound of the pyridine series consisting of pyridine, quinoline, isoquinoline, and C-methyl homologs thereof. (See U. S. Patent No. 2,273,181, dated February 17, 1942, to De Groote and Keiser, claim 1.)

$$D' \vdots N \diagup^{X}_{\diagdown CH_2-NH.OC.R}$$

in which the acyl radical RCO is derived from a monocarboxy detergent-forming acid having at least 8 and not more than 32 carbon atoms; and D′⋮N represents a heterocyclic compound of the pyridine series, consisting of pyridine, quinoline, isoquinoline, and C-methyl homologues thereof; and X stands for the monovalent anion of an acid. (See U. S. Patent No. 2,290,417, dated July 21, 1942, to De Groote and Keiser, claim 1.)

$$D' \vdots N \diagup^{Halogen}_{\diagdown CH_2-CH_2-NT.OC.R}$$

in which T is a member of the class consisting of hydroxy-ethyl radicals, alkyl radicals, aryl radicals, aralkyl radicals, and alicyclic radicals having not more than 22 carbon atoms; the acyl radical RCO is derived from a monocarboxy detergent-forming acid having at least 8 and not more than 32 carbon atoms; and D′⋮N represents a heterocyclic compound of the pyridine series consisting of pyridine, quinoline, isoquinoline, and C-methyl homologues thereof. (See our co-pending application Serial No. 415,763, filed October 20, 1941, now U. S. Patent No. 2,329,700, dated September 21, 1943, claim 1.)

$$D' \vdots N \diagup^{Halogen}_{\diagdown CH_2-\underset{T'}{\overset{T'}{C}}-NT.OC.R}$$

in which T is a member of the class consisting of hydrogen atoms and hydroxyethyl radicals, and T′ is a member of the class consisting of methyl radicals, ethyl radicals, and hydroxymethyl radicals, with the proviso that at least one occurrence of T′ is a radical of the kind designated, and differentiated from a hydrogen atom; RCO is an acyl radical derived from a monocarboxy detergent-forming acid having at least 8 and not more than 32 carbon atoms; and D':N represents a heterocyclic compound of the pyridine series consisting of pyridine, quinoline, isoquinoline, and C-linked methyl homologues thereof. (See our co-pending application Serial No. 415,764, filed October 20, 1941, now U. S. Patent No. 2,329,701, dated September 21, 1943, claim 1.)

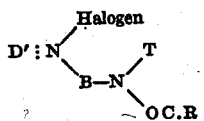

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a detergent-forming monocarboxy acid having at least 8 and not more than 32 carbon atoms; and D':N represents a heterocyclic compound of the pyridine series consisting of pyridine, quinoline, isoquinoline, and C-linked methyl homologues thereof. (See our co-pending application Serial No. 415,765, filed October 20, 1941, now U. S. Patent No. 2,329,702, dated September 21, 1943, claim 1.)

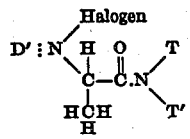

wherein T is a hydrocarbon radical having at least 8 and not more than 32 carbon atoms, and T' is a member of the class consisting of hydrogen atoms, hydrocarbon radicals having less than 8 carbon atoms, and hydrocarbon radicals having at least 8 and not more than 32 carbon atoms; and D':N represents a heterocyclic compound of the pyridine series consisting of pyridine, quinoline, isoquinoline, and C-linked methyl homologues thereof. (See our co-pending application Serial No. 415,766, filed October 20, 1941, now U. S. Patent No. 2,329,703, dated September 21, 1943, claim 1.)

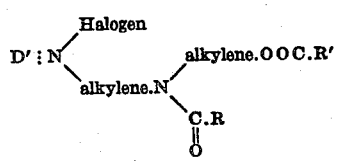

in which RCO is the acyl radical of a low molal monocarboxy acid having 5 carbon atoms or less, and R'CO is the acyl radical of a detergent-forming monocarboxy acid having at least 18 and not more than 32 carbon atoms; and D':N represents a heterocyclic compound of the pyridine series consisting of pyridine, quinoline, isoquinoline, and C-linked methyl homologues thereof. (See co-pending application Serial No. 419,082, filed November 14, 1941, now U. S. Patent No. 2,335,262, dated November 30, 1943, claim 1.)

The manufacture of the compounds above described may be illustrated by the following reactions:

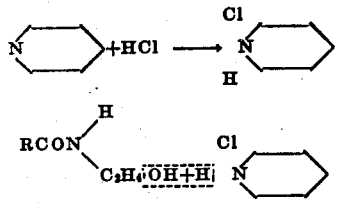

It is to be noted that the halogen atom previously depicted could equally well be the anion of any strong acid, particularly a monobasic acid, such as a sulfonic acid. In other words, such sulfonic acid could be used to neutralize pyridine in the same way as hydrochloric acid or some other halogen acid is employed. In the present instance, alkylated naphthalene sulfonic acids, especially monosulfonic acids of the kind hereinafter described in detail, are employed in such a manner that the halogen atom in the formula previously presented is replaced by the radical DSO₃ derived from an alkylated naphthalene sulfonic acid. In other words, the previous formula is suitably rewritten as follows:

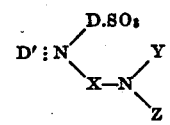

Specifically, then, the compounds herein contemplated may be indicated by the following illustrations:

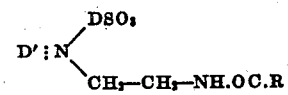

in which the acyl radical R.CO is derived from a monocarboxy detergent-forming acid having at least 8 and not more than 32 carbon atoms, and D':N represents a radical derived from a heterocyclic compound of the pyridine series consisting of pyridine, quinoline, isoquinoline, and C-methyl homologues thereof; and DSO₃ is an alkylated naphthalene sulfonic acid radical in which at least one alkyl group substituted in the naphthalene nucleus contains at least 3 and not over 10 carbon atoms.

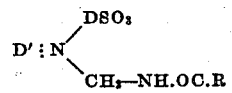

in which the acyl radical RCO is derived from a monocarboxy detergent-forming acid having at least 8 and not more than 32 carbon atoms; and D':N represents a heterocyclic compound of the pyridine series, consisting of pyridine, quinoline, isoquinoline, and C-methyl homologues thereof; and DSO₃ is an alkylated naphthalene sulfonic acid radical in which at least one alkyl group substituted in the naphthalene nucleus contains at least 3 and not over 10 carbon atoms.

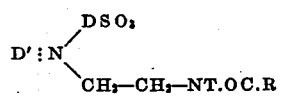

in which T is a member of the class consisting of hydroxyethyl radicals, alkyl radicals, aryl radicals, aralkyl radicals, and alicyclic radicals having not more than 22 carbon atoms; the acyl radical RCO is derived from a monocarboxy detergent-forming acid having at least 8 and not more than 32 carbon atoms; and D':N represents a heterocyclic compound of the pyridine series consisting of pyridine, quinoline, isoquinoline, and C-methyl homologues thereof; and DSO₃ is an alkylated naphthalene sulfonic acid radical in which at least one alkyl group substituted in the naphthalene nucleus contains at least 3 and not over 10 carbon atoms.

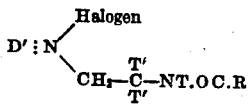

in which T is a member of the class consisting of hydrogen atoms and hydroxyethyl radicals, and T' is a member of the class consisting of methyl radicals, ethyl radicals, and hydroxymethyl radicals, with the proviso that at least one occurrence of T' is a radical of the kind designated, and differentiated from a hydrogen atom; RCO is an acyl radical derived from a monocarboxy detergent-forming acid having at least 8 and not more than 32 carbon atoms; and D':N represents a heterocyclic compound of the pyridine series consisting of pyridine, quinolins, isoquinoline, and C-linked methyl homologues thereof; and DSO₃ is an alkylated naphthalene sulfonic acid radical in which at least one alkyl group substituted in the naphthalene nucleus contains at least 3 and not over 10 carbon atoms.

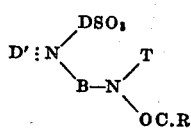

in which B is a divalent aliphatic radical, containing at least one and less than 15 ether linkages; and T is a member of the class consisting of alkyl radicals; aryl radicals; aralkyl radicals; alicyclic radicals; said hydrocarbon radicals having not more than 22 carbon atoms; hydroxylated aliphatic ether radicals of the type B.OH, where B has its previous significance; and hydroxyethyl radicals; and R.CO denotes a radical derived from a detergent-forming monocarboxy acid having at least 8 and not more than 32 carbon atoms; and D':N represents a heterocyclic compound of the pyridine series consisting of pyridine, quinoline, isoquinoline, and C-linked methyl homologues thereof; and DSO₃ is an alkylated naphtalene sulfonic acid radical in which at least one alkyl group substituted in the naphthalene nucleus contains at least 3 and not over 10 carbon atoms.

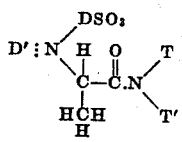

wherein T is a hydrocarbon radical having at least 8 and not more than 32 carbon atoms, and T' is a member of the class consisting of hydrogen atoms, hydrocarbon radicals having less than 8 carbon atoms, and hydrocarbon radicals having at least 8 and not more than 32 carbon atoms; and D':N represents a heterocyclic compound of the pyridine series consisting of pyridine, quinoline, isoquinoline, and C-linked methyl homologues thereof; and DSO₃ is an alkylated naphthalene sulfonic acid radical in which at least one alkyl group substituted in the naph- thalene nucleus contains at least 3 and not over 10 carbon atoms.

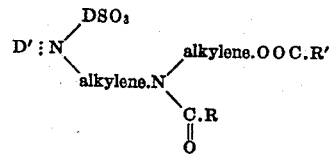

in which RCO is the acyl radical of a low molal monocarboxy acid having 5 carbon atoms or less, and R'CO is the acyl radical of a detergent-forming monocarboxy acid having at least 18 and not more than 32 carbon atoms; and D':N represents a heterocyclic compound of the pyridine series consisting of pyridine, quinoline, isoquinoline, and C-linked methyl homologues thereof; and DSO₃ is an alkylated naphthalene sulfonic acid radical in which at least one alkyl group substituted in the naphthalene nucleus contains at least 3 and not over 10 carbon atoms.

As previously stated, the manufacture of these compounds represents nothing more than following the same procedure referred to in the preceding patent and the aforementioned co-pending applications, except that instead of neutralizing pyridine or a similar compound with hydrochloric acid or the equivalent, one employs an alkylated naphthalene sulfonic acid, as herein described. It is understood that all the various reactants referred to in the above patent and the aforementioned co-pending applications may be used; and this statement applies with the same force and effect as if they were repeated in detail here. It is also obvious that compounds can be obtained by double decomposition, for instance, reacting the pyridinium chloride with a sodium sulfonate in alcoholic solution so as to precipitate sodium chloride. Furthermore, it is obvious that if a polysulfonic acid is employed, for instance, a disulfonic acid, then one mole of such polysulfonic acid could be used to neutralize two moles of pyridine or the equivalent, and the salt so obtained could subsequently be reacted with two moles of an amido compound to give the final quaternary compound.

For the sake of brevity, reference will immediately be made to the manufacture of the alkylated naphthalene sulfonic acids which may be employed.

Alkylated naphthalene sulfonic acids are produced commercially, and the salts are used for a variety of purposes. They are generally produced from naphthalene, because there does not appear to be any advantage in the use of a naphthalene derivative, such as chlor-naphthalene, alpha and beta naphthol, etc. In other words, one could introduce the sulfonic acid residue and the alkyl residues into a substituted naphthalene, such as chlor-naphthalene, etc., just as readily, perhaps, as in the case of naphthalene. Such simple derivatives, of course, are the chemical equivalent of naphthalene in the manufacture of such sulfonic acids as are employed in the manufacture of the present reagent. It is understood that the word "naphthalene" is hereinafter employed to include these derivatives.

The general process of manufacturing the particular salts used to produce the demulsifier employed in our process consists in converting the naphthalene into either the alpha or beta naphthalene sulfonic acid, or a mixture of the same, or in some instances, into a di- or even a tri-sulfonic acid, or a tetrasulfonic acid, or a mixture of the various types. In most instances, there is no advantage in introducing more than one sulfonic acid residue. In many instances, it is unnecessary to use particular care to prepare either only the alpha sulfonic acid, or either only the beta sulfonic acid, because a mixture in which either one or the other predominates, or a mixture in which the alpha and beta sulfonic acids are present in approximately equal amounts, is just as satisfactory as one sulfonic acid completely freed from the other type.

The alcohol employed, such as a propyl alcohol, a butyl alcohol, an amyl alcohol, a hexyl alcohol, a decyl alcohol, etc, is converted into the acid sulfate, such as propyl hydrogen sulfate. The naphthalene sulfonic acid and the alkyl hydrogen sulfate are combined in proportions so that one, two, three, or even four alkyl groups are introduced into the aromatic residue. This condensation reaction is generally carried out in the presence of an excess of sulfuric acid. In some instances, the various reactions, such as sulfonation, sulfation, condensation, etc., are carried out simultaneously. Generally speaking, the di-alkylated and tri-alkylated material appear to yield the most desirable type of reagent. The presence of some mono-alkylated material, or some terta-alkylated material is not objectionable, and may even be desirable.

It is obvious, of course, that the alkylated groups introduced might be desired from olefines, such as butylene, propylene, amylene, etc., insofar that such olefines react directly with sulfuric acid, to produce the alkyl hydrogen sulfates. Of course, in addition to introducing such alkyl residues of the kind described, into the aromatic nucleus, one could also introduce an alkyl residue from some other alcohol, as, for example, an alkylated group derived from ethyl or methyl alcohol, or one might introduce a group derived from an aryl, aralkyl, cyclic, or hydro-aromatic alcohol, or the like, but regardless of whether or not one introduces such other residues, it is necessary that at least one alkyl residue of the kind described, i. e., having at least three carbon atoms and not more than ten carbon atoms, be introduced into the naphthalene ring. Such compounds having some other group present, such as methyl group, might be considered as being derived from methyl naphthalene, instead of naphthalene, and thus, would fall within the class of chemical equivalents previously noted. It is immaterial as to the particular alcohol employed, or the particular isomeric form of the alcohol employed, although generally speaking, it is most desirable to use the one lower in cost. It is immaterial whether one uses normal propyl alcohol or isopropyl alcohol. It is immaterial whether one uses a normal butyl or isobutyl alcohol. It is immaterial whether the alcohol be a primary alcohol, or a secondary alcohol, or a tertiary alcohol, or the like.

It is obvious that a large number of isomers can be produced in the manufacture of the reagent employed as the demulsifier in the present process. For instance, although the sulfonic group may be introduced into either the alpha or beta position, it is manifest that the alkyl group or groups can be introduced into various positions in regard to the position of the sulfonic acid residue. Apparently, as far as we are aware, one isomeric form is as effective as the other. Reference to the compounds is not intended to indicate any particular isomer, unless the text clearly indicates some specific position.

Insofar that the most readily available alcohols, from the standpoint of cost, are isopropyl alcohol, normal butyl alcohol, isobutyl alcohol, and mixed amyl alcohols, it is our preference to produce our reagents from these alcohols, and in some instanes, it is desirable to introduce different alkyl groups, such as a propyl group and butyl group, into the same sulfonaphthalene residue.

In the actual manufacture of alkylated naphthalene sulfonic acids, the composition of the desired chemical reaction is followed by a washing process which removes the excess of sulfuric acid or other sulfonation, sulfation, or condensation reagent employed. The acidic mass thus obtained is neutralized in any convenient manner with any suitable base, such as caustic soda, caustic potash, ammonium hydroxide, and the like. However, in accordance with what has been said herein, the acidic mass is neutralized with the amine of the kind previously described. The final product, if it represents a pasty or semi-solid or solid mass, is rendered suitable for industrial use by the addition of a solvent, such as water, an alcohol, a coal tar solvent, a petroleum hydrocarbon solvent, or the use of any other suitable solvent, such as a phenolic body, or a chlorinated hydrocarbon.

In manufacturing or producing the demulsifier above described, we prefer to obtain a chemical compound by reaction so conducted that three molecules of isopropyl alcohol are united with one molecule of naphthalene by the customary sulfation, sulfonation, and condensation reactions. The resulting mixture consists largely of di-isopropyl naphthalene sulfonic acids and tri-isopropyl naphthalene sulfonic acids, with possibly small amounts of mono-isopropyl sulfonic acids and tetra-propyl sulfonic acids present. Generally speaking, it is easier to conduct the reaction so that the bulk of the sulfonic acid represents the beta type, although the alpha type may be produced, if desired.

Among the compounds which are particularly effective are the salts obtained by reaction between pyridine or the equivalent and the following alkylated naphthalene sulfonic acids, that is: Mono-isopropyl naphthalene sulfonic acids, di-isopropyl naphthalene sulfonic acids, tri- isopropyl naphthalene sulfonic acids, mono-normal butyl naphthalene sulfonic acids, di-normal butyl naphthalene sulfonic acids, mono-isobutyl naphthalene sulfonic acids, di-isobutyl naphthalene sulfonic acids, mono-amyl naphthalene sulfonic acids, di-amyl naphthalene sulfonic acids, tri-amyl naphthalene sulfonic acids, mono-hexyl naphthalene sulfonic acids, di-hexyl naphthalene sulfonic acids, tri-hexyl naphthalene sulfonic acids, mono-octyl naphthalene sulfonic acids, di-octyl naphthalene sulfonic acids, mono-decyl naphthalene sulfonic acids, di-decyl naphthalene sulfonic acids, mono-isopropyl di-normal butyl naphthalene sulfonic acids, di-isopropyl di-normal butyl napthalene sulfonic acids, di-isopropyl mono-amyl naphthalene sulfonic acids, mono-isopropyl mono-hexyl naphthalene sulfonic acids, etc.

In the following examples it will be noted that they are substantially in verbatim form, as they appear in the aforementioned patents or copending applications, except that one mole of dipropylated naphthalene sulfonic acid is substituted for hydrochloric acid or its equivalent, and certain other modifications may obviously be required in light of changed solubilities.

Example 1

500 g. of a fatty acid ethanolamide, obtained by reaction of split cocoanut oil (containing all the natural acids, beginning with the caprylic up to the stearic acid, and some oleic acid) with monoethanolamine, 600 g. hydrosulfonate of a fraction of pyridine bases (50% distilling up to 140° C., 90% distilling up to 160°, completely soluble in water) and 100 g. of the mixture of the free pyridine bases, are heated at 100° C., or even higher, for one-half to five hours.

When working at 150-160° C., the reaction is more rapid. Furthermore, pure pyridine may be used instead of a mixture of pyridine bases. (Compare with Example 2 of Haack Patent No. 2,242,211.)

The hydrosulfonate employed is conveniently obtained by neutralizing the pyridine bases with dipropylated naphthalene sulfonic acid. (Compare also with Example 1 of U. S. Patent No. 2,273,181.)

Example 2

One pound mole of octyllactamide (derived by reaction between octylamine and ethyl lactate) is reacted with 1.1 pound moles of pyridine hydrosulfonate in the presence of one-twentieth of a mole of free pyridine. The reaction is conducted at approximately 150-160° C., until the substituted lactamide has been converted into the quatenary compound. This reaction is complete in a comparatively short time, in some instances less than one hour, although in other instances three or four hours may be required. If desired, the reaction may be conducted at a slightly higher temperature, for instance, as high as 180° C. Instead of using pyridine hydrosulfonate, one may employ the hydrosulfonate of a fraction of pyridine bases of the kind that 50% will distil over at 140° C. or below, and 90%, at 160° C. or below. Such selected pyridine bases are of the kind which are entirely water-soluble. The hydrosulfonate employed is obtained by neutralizing the pyridine bases with dipropylated naphthalene sulfonic acid. (Compare with our co-pending application Serial No. 415,766, now U. S. Patent No. 2,329,703, dated September 21, 1943.)

Example 3

12 parts of stearohydroxymethylamide, 20.2 parts of anhydrous pyridine hydrosulfonate, and 20 parts of pyridine are stirred together at 70-80° C. until a test sample of the reaction mixture dissolves in water to give clear solutions. The reaction mixture is then distilled at 60-70° C. under reduced pressure to remove pyridine. The quaternary salt, stearamidomethylpyridinium hydrosulfonate, thus obtained, corresponds to the following formula:

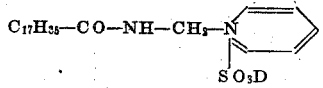

The hydrosulfonate employed is obtained by neutralizing the pyridine bases with dipropylated naphthalene sulfonic acid. (See our U. S. Patent No. 2,290,417, dated July 21, 1942.) (See also Example 2 of U. S. Patent No. 2,146,392, to Baldwin et al.)

Example 4

570 grams of fatty acid diethanolamide, obtained by reaction of split cocoanut oil (containing all the natural acids, beginning with the capric up to stearic, and some oleic), with diethanolamine, 615 g. hydrosulfonate of a fraction of pyridine bases (50% distilling up to 140° C., 90% distilling up to 160°, completely soluble in water), and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained may be further worked up to form a 10% water solution, or rather, a sol or self-emulsifying dispersion or hydrophile mixture.

When working at 150-160°, the reaction is more rapid. Furthermore, pure pyridine may be used instead of a mixture of pyridine bases. (Compare with Example 2 of the aforementioned Haack U. S. Patent No. 2,242,211.)

The hydrosulfonate employed is obtained by neutralizing the pyridine bases with dipropylated naphthalene sulfonic acid. (Compare also with our co-pending application Serial No. 415,763, now U. S. Patent No. 2,329,700, dated September 21, 1943.)

Example 5

360 g. of a fatty acid amide, obtained by reaction of split cocoanut oil (containing all the natural acids, beginning with the capric up to the stearic acid, and some oleic acid) with tris (hydroxymethyl) aminomethane, 371 g. hydrosulfonate of a fraction of pyridine bases (50% distilling, up to 140° C., 90% distilling, up to 160, completely soluble in water), and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium-, and other homologous pyridinium compounds obtained, may be further worked up to form a 10% water solution, or rather, a sol or self-emulsifying dispersion or hydrophile mixture.

The hydrosulfonate employed is obtained by neutralizing the pyridine bases with dipropylated naphthalene sulfonic acid. (Compare with our co-pending application, Serial No. 415,764, now U. S. Patent No. 2,329,701, dated September 21, 1943, Example 1.)

Example 6

One pound mole of the amide derived from mixed cocoanut oil is reacted with 4 pound moles of ethylene oxide to give an amide corresponding to the following formula, wherein R.CO represents the acyl radical of the mixed cocoanut oil fatty acids RCON $(C_2H_4OC_2H_4OH)_2$. One pound mole of such raw material is reacted with one pound mole of pyridine hydrosulfonate at approximately 150-160° C. in the presence of a slight amount of pure pyridine. Reaction is continued until complete, as indicated by solubility and absence of the initial reactants. Instead of pure pyridine, a mixture of pyridine bases, for instance, 50% distilling, up to 140° C., and 90% distilling at 160° C., and completely soluble in water, may be employed as a reactant. The hydrosulfonate employed is obtained by neutralizing the pyridine bases with dipropylated naphthalene sulfonic acid. (Compare with Example 2 of the aforementioned Haack Patent No. 2,242,211. Compare also with our co-pending application Serial No. 415,765, now U. S. Patent No. 2,329,702, dated September 21, 1943.)

Example 7

One pound mole of the esteramide derived by reaction between equi-molar portions of bis(hydroxyethyl)acetamide and ricinoleic acid is heated with 1.05 moles of pyridine hydrosulfonate at 140–150°, until clearly water-soluble, or at least, a sol or self-emulsifying dispersion or hydrophile mixture. The time required is generally less than one hour, and the reaction is hastened by the presence of a small amount, 1% or 2%, of free pyridine. If desired, the reaction may be conducted at a slightly higher temperature, for instance, 160–170° C. Instead of using pyridine hydrosulfonate, one may employ the hydrosulfonate of a fraction of pyridine bases, of the kind that 50% would distil over 140° C. or below, and 90% at 160° C. or below. Such selected pyridine bases are of the kind which are entirely water-soluble. The hydrosulfonate employed is obtained by neutralizing the pyridine bases with dipropylated naphthalene sulfonic acid. (Compare with our co-pending application Serial No. 419,082, now U. S. Patent No. 2,335,262, dated November 30, 1943, Example 1.)

The general method of manufacture is obvious, in view of what is said in the aforementioned patents and the aforementioned co-pending applications, and also in light of the above illustrations. Generally speaking, the convenient procedure is as follows:

(a) Prepare a suitable naphthalene sulfonic acid, for instance, dipropyl naphthalene monosulfonic acid, and most preferably, in anhydrous or substantially anhydrous form. If too viscous for apparatus available, or in any instance, dilute conveniently with a high boiling solvent.

(b) Neutralize pyridine or a selected pyridine base with such sulfonic acid, using equivalent molal proportions.

(c) Obtain a high molal amide of any one of the types previously suggested, for instance, amides derived from a high molal monocarboxy detergent-forming acid and a hydroxylated primary or secondary amine; an amide derived from a low molal hydroxy acid, particularly lactic acid, and an amine such as octadecylamine; or a hydroxylated amide of a low molal non-hydroxy acid, such as acetic acid, and esterify the hydroxy ethyl group, or the like, with a high molal acid.

(d) React one mole of the hydroxylated amide and one mole of the pyridinium hydrosulfonate for approximately one-half to five hours at approximately 160–200° C. temperature.

(e) If the reaction does not take place smoothly and without difficulty, it can frequently be hastened by the presence of some of the free base, for instance, an amount of the free base equivalent to 5–25% of the amount present as the hydrosulfonate.

(f) If the pyridine hydrosulfonate is water-soluble, and if the hydroxylated amide is water-soluble or forms a colloidal sol, then, if reaction results in an insoluble product, the very formation of such product indicates completeness of reaction. However, this index is not entirely satisfactory for a number of reasons. In the first place, the pyridine hydrosulfonate may not be water-soluble to any marked degree. In the second place, the pyridine hydrosulfonate may be obtained from a sulfonic acid which has present some inert high boiling solvent which imparts water insolubility to the mixture. Finally, even though the reaction involved produces an insoluble product, the presence of either reactant in slight excess may act as a peptizing agent and produce a solution or sol. Similarly, there may be present an impurity which does not enter into the reaction at all, and yet acts as a peptizing agent and produces a solution under conditions which would ordinarily suggest formation of an insoluble precipitate.

For this reason, completeness of reaction is best predicated upon other tests. If the reaction time is continued from two to five hours, and particularly if the longer period is employed at a temperature of 180–200° C., reaction is generally complete. Secondly, if the reaction mass is purified, a molecular weight determination will now show that reaction has taken place insofar that the molecular weight of the resultant is equal to the sum of the molecular weight of the two reactants.

A small amount of the reaction mass may be acidified with HCl so as to convert uncombined pyridine into the hydrochloride. An acidic pyridine hydrochloride solution can be treated with caustic and pyridine liberated or determined in any suitable manner. The amount of pyridine remaining in the reaction mass is an index, of course, to the degree to which the reaction has taken place.

Instead of using the above procedure, one may use the method of double decomposition. This depends on forming the pyridinium hydrochloride, not the hydrosulfonate, and obtaining the quaternary compound in the chloride or equivalent form, as described in aforementioned U. S. Patent No. 2,273,181, and also in the various aforementioned co-pending applications and patent. Having obtained the quaternary chloride or equivalent, if it is water-soluble, then one need only prepare an aqueous solution. Similarly, one prepares an aqueous solution of the selected naphthalene sulfonic acid salt, for instance, the sodium, ammonium, or potassium salt, of dipropylated monosulfonic acid. These two aqueous solutions are mixed in molar proportions. A precipitate is formed and sodium chloride or potassium chloride or ammonium chloride passes into the water phase and can be discarded. Here again, precaution must be taken that the mixture of the two reactions, or rather, that the resultant, is not rendered water-soluble by peptizing action, as previously described.

Another satisfactory procedure is to use the double decomposition method by employing anhydrous materials dissolved in absolute alcohol or its equivalent. When the two solutions are mixed, sodium chloride is precipitated and the resultant stays dissolved in the alcohol. Filtration or decantation can be employed to remove the insoluble salt such as sodium chloride, and the alcohol can be evaporated from the resultant and re-used in further manufacture.

It is to be noted that the various reactants employed for producing compounds of the kind herein contemplated include the following: Monocarboxy detergent-forming acids; high molal amines; hydroxylated primary and secondary amines; low molal hydroxy acids, such as lactic acid; non-hydroxylated low molal acids, such as acetic acid, butyric acid, etc., having less than 8 carbon atoms; aldehydes, and particularly formaldehyde (the aldehydes can be used to react with high molal acid amides, such as stearamide, to produce a hydroxymethyl stearamide).

It is well known that certain monocarboxy organic acids containing eight carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The low molal non-hydroxy monocarboxy acids include acetic acid, propionic acid, butyric acid, valeric acid, etc.

Hydroxy alkyl ether radicals may be obtained from oxyalkylated amides. For instance, a high molal carboxy acid or its functional equivalent, such as the ester, acyl chloride, anhydride, etc., may be reacted with a primary or secondary hydroxylated amine, such as monoethanolamine, diethanolamine, monopropanolamine, dipropanolamine, tris(hydroxymethyl)aminomethane, etc. The amide so obtained is treated with an oxyalkylating agent containing a reactive ethylene oxide ring, such as ethylene oxide, butylene oxide, glycid, etc. The amides derived from low molal acids can be similarly treated; for instance, the amides derived from lactic acid, acetic acid, etc.

Other suitable amines used as reactants for amidification include: 2-amino-1-butanol; 2-amino-2-methyl-1-propanol; 2-amino-2-methyl-1,3-propane diol; 2-amino-2-ethyl-1,3-propane diol; tris(hydroxymethyl)aminomethane.

Instead of using monoethanolamine, diethanolamine, or the like, one may use compounds such as amyl ethanolamine, cyclohexyl ethanolamine, benzyl ethanolamine, etc. In some instances, the amides are preferentially obtained by reacting the high molal acid, for instance, a higher fatty acid, with cyclohexylamine, amylamine, benzylamine, aniline, or the like, and then treating the amide with ethylene oxide or the like so as to introduce a hydroxyethyl group. As to the production of hydroxymethyl substituted amides, i. e., reactants suitable for combination with a pyridine hydrosulfonate, see U. S. Patent No. 2,125,901, dated August 9, 1938, to Evans et al.; and U. S. Patent No. 2,146,392, dated February 7, 1937, to Baldwin et al. The hydroxymethyl stearamides are obtained by use of formaldehyde as a reactant.

As to high molal amines which are suitable for reaction with lactic acid or the like, the latter supplying both the amido radical and the reactive hydroxyl, reference is made to U. S. Patent No. 2,246,842, dated June 24, 1941, to De Groote.

It is to be noted that that particular patent excludes arylamines; but it is understood that such compounds are not excluded in the present instance. For instance, naphthylamine, methyl naphthylamine, ethyl naphthylamine, and the like, may be employed.

Furthermore, attention is directed to the fact that said aforementioned De Groote patent contemplates, inter alia, certain tertiary amines. Such amines, of course, are not herein contemplate as reactants, insofar that there is no reactive hydrogen atom available.

The primary amines which may be used as such, or converted into secondary amines by conventional processes, such as treatment with methyl iodide, benzyl chloride, alkyl sulphates, or the like, include the following: octadecenylamine; cetylamine; stearylamines; oleoamine; ricinoleoamine; amines derived from naphthenic acids; amines derived from octadecadiene 9,11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc. The amines may be aliphatic, aralkyl, alicyclic, aryl, alkyl, etc.

One may also employ amines derived from acids obtained by oxidation of wax, paraffin, etc. Such acids may have as many as 32 carbon atoms. For instance, see U. S. Patent No. 2,242,837, dated May 20, 1941, to Shields. The following patents listed in the aforementioned De Groote Patent No. 2,246,842, are herein included as a matter of convenience indicating means of obtaining such high molal primary or secondary amines or methods which can be obviously modified to produce the same: U. S. Patents Nos. 1,951,469, dated Mar. 20, 1934, Bertsch; 2,006,058, dated June 25, 1935, Olin; 2,033,866, dated Mar. 10, 1936, Schrauth; 2,074,830, dated Mar. 23, 1937, Flett; 2,078,922, dated May 4, 1937, Arnold; 2,091,105, dated Aug. 24, 1937, Pigott; 2,108,147, dated Feb. 15, 1938, Speer; 2,110,199, dated Mar. 8, 1938, Caróthers; 2,132,902, dated Oct. 11, 1938, Lenher; 2,178,522, dated Oct. 31, 1938, Ralston; British Patents Nos. 359,001, of 1932, Johnson; and 358,114, of 1932, Carpmael.

Conventional demulsifying agents employed in the treatment of oil field emulsions are used as such, or after dilution with any suitable solvent, such as water, petroleum hydrocarbons, such as gasoline, kerosene, stove oil, coal tar products, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, complex amine type, the petroleum sulfonate type, etc.

It is well known that conventional demulsifying agents may be used in a water-soluble form, or in an oil-soluble form, or in a form exhibiting both oil and water solubility. Sometimes they may be used in a form which exhibits relatively limited water-solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

In practising our process in regard to oil field emulsions, a treating agent or demulsifying agent of the kind above describe is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It may be well to point out that for the sake of simplicity the bulk of the hereto appended claims are concerned with the monosulfonic acids. In such instances where there is present more than one sulfonic acid radical, as in the formation of a disulfonic acid, or a trisulfonic acid, or a tetrasulfonic acid, if desired, all the sulfonic radicals may be neutralized with compounds of the kind previously described, or some of the sulfonic acid radicals may be neutralized with some other suitable base, such as sodium hydroxide, potassium hydroxide, ammonium hydroxide, etc., provided that at least one sulfonic acid radical has been neutralized by an amido pyridinium compound of the kind previously described.

The monosulfonic acid can be presented in the following form so as to show the electrovalent linkage:

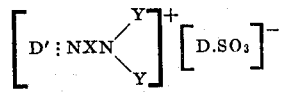

in which the various characters have their previous significance.

The polysulfonic acids would be indicated in the following manner:

in which $m$ has a value of one or more, and $n$ has the value of 2 or more. "Cation" indicates a cation other than the amido pyridinium type. The new material or compound herein described, forms the subject-matter of our divisional application Serial No. 500,720, filed August 30, 1943.

Having thus described our invention, what we claim as new and desire to secure by Letters Patent is:

1. A process for breaking petroleum emulsions of the water-in-oil type, characterized by subjecting the emulsion to the action of a demulsifying agent comprising a compound consisting of the salt of an amido pyridinium base; said amido pyridinium base salt being obtained from an alkylated naphthalene sulfonic acid in which at least one alkyl group substituted in the naphthalene nucleus contains at least 3 carbon atoms and not more than 10 carbon atoms; and the amido pyridinium base cation being of the following formula:

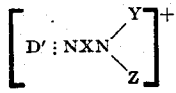

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; Z is a member of the class consisting of hydrogen atoms, acyl radicals, hydrocarbon radicals having not over 22 carbon atoms, alkylol radicals, acylated alkylol radicals, hydroxylated aliphatic ether radicals, and acylated hydroxylated aliphatic ether radicals; with the added proviso that there must be an acyl radical directly linked to the trivalent nitrogen atom; and there must be present at least one hydrocarbon radical containing at least 8 and not more than 32 carbon atoms as an integral part of at least one of the radicals linked to the trivalent nitrogen atom.

2. A process for breaking petroleum emulsions of the water-in-oil type, characterized by subjecting the emulsion to the action of a demulsifying agent comprising a compound of the following formula:

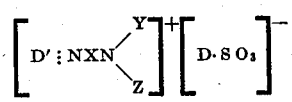

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be one acyl radical linked to the trivalent nitrogen atom; and there must be present at least one hydrocarbon radical containing at least 8 and not more than 32 carbon atoms or an integral part of at least one of the radicals linked to the trivalent nitrogen atom; and D.SO₃ is an alkylated naphthalene monosulfonic acid radical, in which at least one alkyl group substituted in the naphthalene nucleus contains at least 3 and not over 10 carbon atoms.

3. A process for breaking petroleum emulsions of the water-in-oil type, characterized by subjecting the emulsion to the action of a demulsifying agent comprising a compound of the following formula:

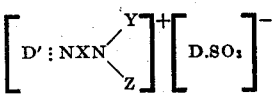

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alklyol radicals, and acylated hydroxylated aliphatic ether radicals; and Z is a member of the class consisting of hydrogen atoms, acyl radicals, hydrocarbon radicals, having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom; and there must be present at least one hydrocarbon radical containing at least 8 and not more than 32 carbon atoms as an integral part of at least one of the radicals linked to the trivalent nitrogen atom; and D.SO$_3$ is a propylated naphthalene monosulfonic acid radical.

4. A process for breaking petroleum emulsions of the water-in-oil type, characterized by subjecting the emulsion to the action of a demulsifying agent comprising a compound of the following formula:

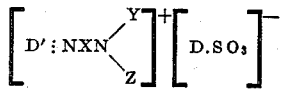

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom; and there must be present at least one hydrocarbon radical containing at least 8 and not more than 32 carbon atoms as an integral part of at least one of the radicals linked to the trivalent nitrogen atom; and D.SO$_3$ is a butylated naphthalene monosulfonic acid radical.

5. A process for breaking petroleum emulsions of the water-in-oil type, characterized by subjecting the emulsion to the action of a demulsifying agent comprising a compound of the following formula:

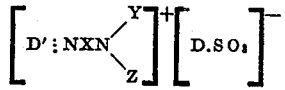

in which D':N represents a radical derived from a heterocyclic compound of the pyridine series, consisting of pyridine, quinoline, isoquinoline, and C-methyl linked homologues thereof; and X is a divalent aliphatic radical; and Y is a member of the class consisting of acyl radicals, hydrocarbon radicals having not over 22 carbon atoms, alkylol radicals, hydroxylated aliphatic ether radicals, acylated alkylol radicals, and acylated hydroxylated aliphatic ether radicals; and Z is a member of the class consisting of hydrogen atoms, acyl radicals, hydrocarbon radicals having not over 22 carbon atoms, alkylol radicals, hydroxylated aliphatic ether radicals, acylated alkylol radicals, and acylated hydroxylated aliphatic ether radicals; with the added proviso that there must be an acyl radical linked to the trivalent nitrogen atom and there must be present at least one hydrocarbon radical containing at least 8 and not more than 32 carbon atoms as an integral part of at least one of the radicals linked to the trivalent nitrogen atom; and D.SO$_3$ is an amylated naphthalene monosulfonic acid radical.

MELVIN DE GROOTE.
BERNHARD KEISER.